UNITED STATES PATENT OFFICE 2,361,444

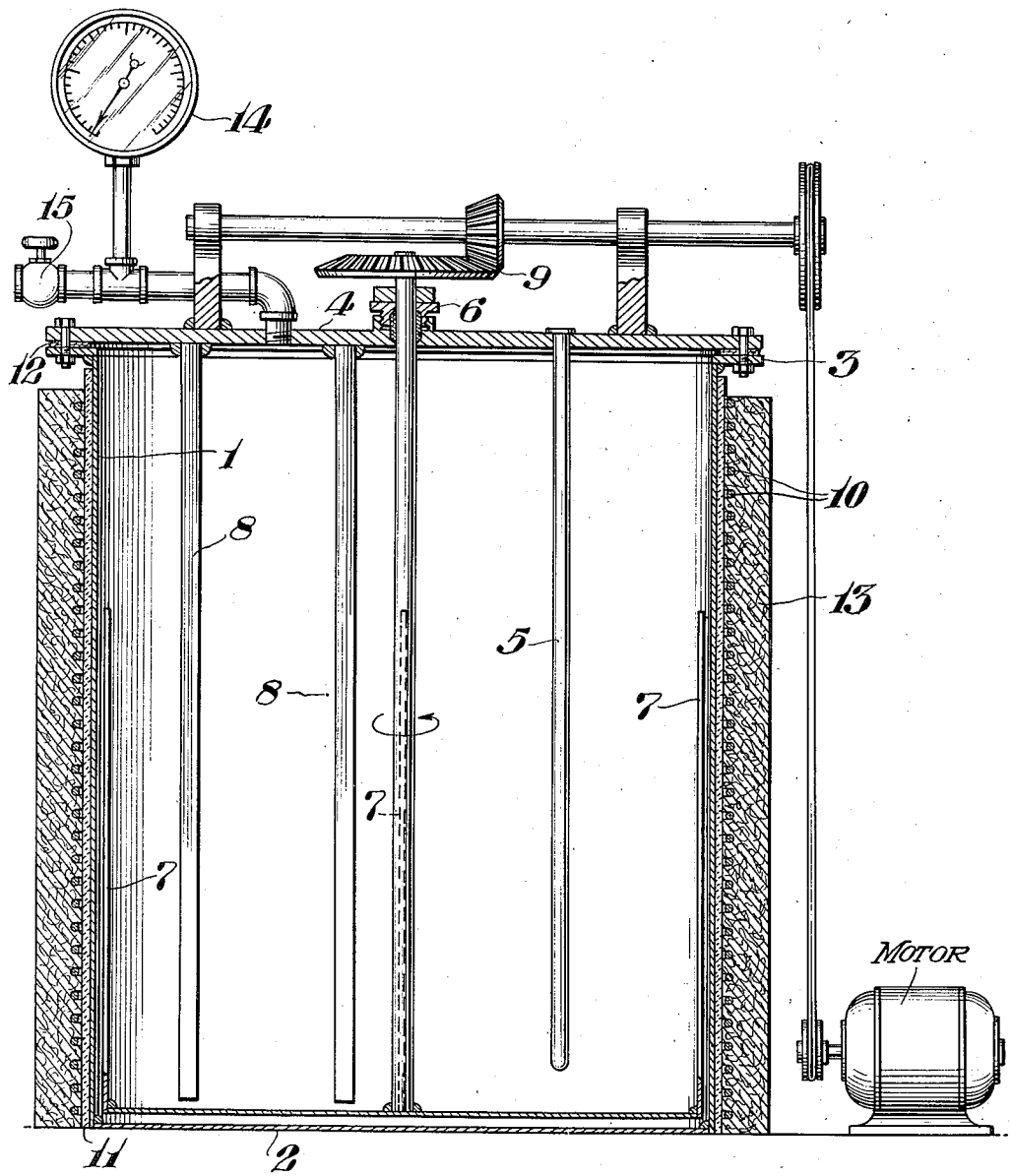

PROCESS FOR PRODUCING PHOSPHATIC FERTILIZER WITH A DEFICIENCY OF MINERAL ACIDS

Thomas W. Zbornik, Cresco, Iowa, assignor to The American Agricultural Chemical Company, New York, N. Y., a corporation of Delaware Application January 12, 1942, Serial No. 426,482

9 Claims. (Cl. 71—41)

This invention relates to a process for producing phosphatic fertilizer from raw phosphate and proportion of mineral acids less than has been heretofore required and universally employed. The term "raw phosphate" is understood to include mineral phosphate, bone phosphate, or any tribasic phosphate of calcium. The present application includes a continuation of the subject matter disclosed and claimed in my copending application Serial No. 352,048, filed August 10, 1940, for process for producing phosphatic fertilizers with a deficiency of mineral acids.

The drawing shows in vertical section a suitable apparatus with which to carry out the process of the invention.

The great bulk of phosphatic fertilizer is today manufactured by acidulating mineral prosphate with mineral acids. Phosphoric and sulfuric acids or mixtures of these acids are generally employed as acidulating agents.

The purpose of acidulating mineral phosphate is to convert the phosphorus from its unavailable condition in mineral phosphate into a form in which it is assimilable by plants. Phosphorus in the form of monocalcium phosphate is assimilable by plants, and therefore monocalcium phosphate is said to be available.

The principal phosphatic product of the present art of manufacturing fertilizer from mineral phosphate and mineral acid is monocalcium phosphate; and the manufacture of superphosphate, when phosphoric acid is employed, is represented conventionally by the following reaction.

$Ca_{10}(PO_4)_6F_2 + 14H_3PO_4 + 10H_2O =$
$\quad\quad 10Ca(H_2PO_4)_2 \cdot H_2O + 2HF$ (I)

The proportion of acid required to convert mineral phosphate to superphosphate depends upon the composition of the raw phosphate and in practice is usually determined by trial and error. In the art acid is added in such an amount that after curing the superphosphate has by analysis a free acid content and a citrate-insoluble $P_2O_5$ content which allow the manufacturer the greatest economic advantage.

The pounds of 100 per cent $H_3PO_4$, or its acidulation equivalent, required to react with 100 pounds of raw phosphate to form monocalcium phosphate is given by the following calculation 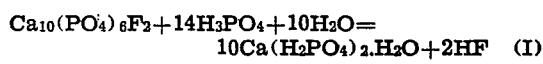 which involves the predominating positive and negative radicals of the ingredients phosphate.

$Qm = [\%CaO(3.495) + \%Fe_2O_3(1.227) +$
$\quad\quad \%Al_2O_3(1.923)]$
$\quad\quad - [\%P_2O_5(1.381) + \%F_2(2.472)]$ In this calculation minor radicals of raw phosphate are disregarded, since their amounts are small and their acid requirements cancel. The $H_2SO_4$, $HNO_3$, and $HCl$ acidulation equivalents of $H_3PO_4$ are $$\frac{H_2SO_4}{2 \times H_3PO_4}, \frac{HNO_3}{H_3PO_4}, \text{ and } \frac{HCl}{H_3PO_4}$$

respectively, and derive from a consideration of reactions II, III, IV, and I.

$Ca_{10}(PO_4)_6F_2 + 7H_2SO_4 + 3H_2O =$
$\quad\quad 3Ca(H_2PO_4)_2 \cdot H_2O + 7CaSO_4 + 2HF$ (II)
$Ca_{10}(PO_4)_6F_2 + 14HNO_3 + 3H_2O =$
$\quad\quad 3Ca(H_2PO_4)_2 \cdot H_2O + 7Ca(NO_3)_2 + 2HF$ (III)
$Ca_{10}(PO_4)_6F_2 + 7H_2SO_4 + 3H_2O =$
$\quad\quad 3Ca(H_2PO_4)_2 \cdot H_2O + 7Ca(Cl_2)_2 + 2HF$ (IV)

Qm of the foregoing calculation is a definition of complete acidulation and is in accord with plant practice when complete conversion of the phosphorus of raw phosphate to monocalcium phosphate is desired.

If a proportion of acid less than that indicated by Qm for any particular mineral phosphate is employed in its acidulation, the resulting partially acidulated mass contains for all practical purposes monocalcium phosphate and soluble phosphates of iron and aluminum equivalent to the amount of acid employed and unreacted, un-available mineral phosphate. Were it possible to conduct the acidulation of mineral phosphate in such a manner that dicalcium phosphate, instead of monocalcium phosphate, would result, a lesser proportion of acid than is now required would be necessary for the conversion of phosphorus to an assimilable form. Dicalcium phosphate, like monocalcium phosphate, is soluble in neutral ammonium citrate and available to plants but, unlike monocalcium phosphate, is insoluble in water.

Conversion of mineral phosphate with phosphoric acid to dicalcium phosphate is represented conventionally by the Reaction V.

$Ca_{10}(PO_4)_6F_2 + 4H_3PO_4 = 10CaHPO_4 + 2HF$ (V)

The pounds of 100 per cent $H_3PO_4$, or its acidulation equivalent, theoretically required to react with 100 pounds of raw phosphate to form dicalcium phosphate is given by the following calculation. Qd differs from Qm only in the equivalence factor of CaO.

$$Qd = [\%CaO(1.748) + \%Fe_2O_3(1.227) + \%Al_2O_3(1.923)] - [\%P_2O_5(1.381) + \%F_2(2.472)]$$

Qd indicates the lowest proportion of acid employable in this invention and is the lowest proportion of acid with which direct conversion of all the phosphorus of raw phosphate to dicalcium phosphate might be obtained.

An operative process for converting the phosphorus of mineral phosphate to an assimilable form with a deficiency of mineral acids would allow many advantages. Some of the more apparent advantages would be (1) an economy of acidulating agent, (2) an appreciable increase in the amount of available $P_2O_5$ produceable for a unit investment in an acid plant, and (3) a neutral and highly desirable fertilizer.

Realization of these advantages is the object of this invention. And this invention is a process for converting the phosphorus of raw phosphate to an assimilable form with a deficiency of mineral acids. This invention results from the discovery of an exothermic chemical transition, and this discovery was disclosed in patent application Serial Number 352,048. The underlying principles of the exothermic chemical phenomenon are here presented so that the scope of this invention may be comprehended.

Monocalcium phosphate possesses the property of decomposing in the presence of $H_2O$ into dicalcium phosphate and phosphoric acid according to the Reaction VI.

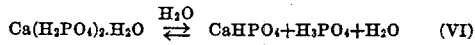

$$Ca(H_2PO_4)_2 \cdot H_2O \underset{}{\overset{H_2O}{\rightleftarrows}} CaHPO_4 + H_3PO_4 + H_2O \qquad (VI)$$

Anomalously this decomposition proceeds as the concentration of monocalcium phosphate and temperature are increased. If to mineral phosphate is added an amount of phosphoric acid less than that required for complete acidulation, the resulting partially acidulated mass contains predominantly monocalcium phosphate and unreacted mineral phosphate. If this partially acidulated mass is charged to a pressure apparatus and simultaneously mixed and subjected to temperatures between 130° C. and 220° C. and gage pressures greater than 25 pounds per square inch, a vigorous transition of decomposition of monocalcium phosphate into dicalcium phosphate and phosphoric acid and exothermic conversion of the mineral phosphate by the liberated phosphoric acid ensues, providing the moisture content of the mass is favorable.

The temperature and pressure at which the vigorous transition of decomposition and exothermic conversion begins depend upon (1) the reactivity of the mineral phosphate employed, (2) the moisture content of the mass being subjected to treatment in a pressure apparatus, and (3) the proportion of mineral acid employed. The temperature and pressure ranges of the exothermic chemical transition depend upon (1) the mineral phosphate employed and (2) the proportion and kind of acid involved. Since mineral phosphates vary in composition and their reactivity can be determined only experimentally, the precise temperature and pressure at which the exothermic chemical transition begins and the temperature and pressure ranges of exothermic transition must be determined experimentally for any particular mineral phosphate and conditions of moisture content and acidulation.

When the moisture content of the partially acidulated mass being subjected to treatment in a pressure apparatus is above the critical, the equilibrium characteristics of the $CaO-P_2O_5-H_2O$ system are such that they disallow the decomposition of monocalcium phosphate to liberate phosphoric acid in an amount and at a rate sufficient to allow the conversion of an appreciable amount of mineral phosphate. Monocalcium phosphate even in dilute solutions decomposes to dicalcium and phosphoric acid to a limited extent; but when considerable amounts of $H_2O$ are present, the equilibrium characteristics of the decomposing system prohibit the decomposition of monocalcium phosphate and the consequent liberation of phosphoric acid in amounts and at rates sufficient to allow the attainment of what those in the art might consider a useful result. It is only when the moisture content of the mass being subjected to temperatures between 130° C. and 220° C. in a pressure apparatus is sufficiently low that a useful result may be attained. The limiting or critical moisture content above which no useful result can be attained will be set forth by experimental evidence later.

Above 220° C. in the presence of $H_2O$ dicalcium phosphate begins to lose water of constitution and forms $Ca_2P_2O_7$. Calcium pyrophosphate is unavailable to plants, and therefore no useful result is attained by the use of temperature greatly above 220° C. Although under some conditions it commences at approximately 130° C., the exothermic chemical transition herein described has never been observed to occur completely below 130° C. and gage pressures less than 25 pounds per square inch. For purposes of this invention either developed or applied steam pressures may be employed. Applied pressures of inert gases may also be employed. Carbon dioxide, nitrogen oxides, and sulfur dioxide act as acidulating agents at elevated temperatures and pressures in the presence of monocalcium phosphate, and are examples of active gases which may be utilized.

The work which resulted in the discovery of the exothermic chemical transition herein described was conducted in an autoclave. The autoclave was constructed from an eight-inch length of standard six-inch steel pipe 1 to one end which was welded a bottom plate 2 and to the other end a flange collar 3 which was provided with ten bolt holes matching those of the autoclave cover. Into the autoclave cover 4 a temperature well 5 and a packing gland 6 were welded; through the latter the shaft of a four-bladed stirrer 7 rotated. Two stationary mixing blades 8 were welded to the bottom side of the autoclave cover. The stirrer was operated by a motor through a reduction bevel gear 9. Pressure and temperature were developed within the autoclave by allowing current to pass through the coiled heating element 10. The heating element was separated from the iron body of the autoclave by a fire clay preparation 11. The autoclave cover was held fast to the flange collar with ten ½-inch bolts; the autoclave cover was separated from the collar with a composition gasket 12. Heat was prevented from being dissipated into the atmosphere with asbestos insulation 13. The autoclave was provided with a pressure gage 14 and a gas-escape valve 15.

The following conversion illustrates this invention: To four kilograms of mineral phosphate, ground to 100 per cent minus 150 mesh, were added 1400 cubic centimeters of 85 per cent phosphoric acid and 100 cubic centimeters of water. This mass was thoroughly mixed, sampled for analysis, and divided into four equal portions. The analyses of the mineral phosphate and the partially acidulated mineral phosphate are as follows:

| Mineral phosphate | Partially acidulated mineral phosphate |
|---|---|
| *Per cent* | *Per cent* |
| CaO _____ 48.2 | Moisture [1] _____ 3.06 |
| Al$_2$O$_3$ _____ 1.0 | Available P$_2$O$_5$ _____ 36.00 |
| Fe$_2$O$_3$ _____ 0.9 | Insoluble P$_2$O$_5$ _____ 9.58 |
| P$_2$O$_5$ _____ 34.4 | Total P$_2$O$_5$ _____ 45.58 |
| F$_2$ _____ 3.9 | Water soluble P$_2$O$_5$ _____ 31.91 |

[1] Moisture determined by heating a sample at 105° C. for five hours. All analyses according to Association of Official Agricultural Chemists, Methods and Analysis, 4th edition.

The acid requirement, Qm, for complete acidulation of this mineral phosphate is 113.8 weight units of 100 per cent H$_3$PO$_4$ for each 100 weight units of raw phosphate. Since the equivalent of 50.7 grams of 100 per cent H$_3$PO$_4$ were employed for each 100 grams of mineral phosphate, the percentage acidulation is 44.5. One portion, weighting 1.62 kilograms, of the partially acidulated mineral phosphate described was charged to the autoclave, the autoclave cover bolted down, the motor operating the stirrer started, and the heating element switch closed. After the mass within the autoclave reached decomposition and conversion temperature and pressure, noted by an abrupt increase in temperature and pressure and an increased load on the motor operating the stirrer, the current flowing through the heating element was discontinued by opening the heating element switch. Within eight minutes the temperature increased from 130° C. to 189° C., and the pressure increased from 50 to 113 pounds per square inch (gage), as a result of decomposition of monocalcium phosphate into dicalcium phosphate and phosphoric acid and exothermic conversion of mineral phosphate by the liberated phosphoric acid. The temperature and pressure having ceased to increase, indicating a completion of reactions, the pressure within the autoclave was released by opening the gas-escape valve.

The autoclave was opened and the product sampled for analysis. The analysis of product is as follows.

| | Percent |
|---|---|
| Moisture | 1.76 |
| Available P$_2$O$_5$ | 48.26 |
| Insoluble P$_2$O$_5$ | 0.94 |
| Total P$_2$O$_5$ | 49.20 |
| Water soluble P$_2$O$_5$ | 14.24 |

The P$_2$O$_5$ insoluble in neutral ammonium citrate, converted to the dry basis, of the partially acidulated mineral phosphate before and after the treatment described is 9.7 per cent and 0.96 per cent, respectively. The exothermic chemical transition, and its discovery, which allows this conversion of citrate insoluble P$_2$O$_5$ to a citrate soluble form, is the essence of this invention.

Four conversions, conducted in precisely the same manner already described, and pertinent information are summarized in Table I to illustrate further this invention.

TABLE I

| Conversion number | Mineral phosphate employed | Qm | Grams H$_3$PO$_4$ employed per kilogram mineral phosphate—expressed as 100% H$_3$PO$_4$ | Per cent acidulation | Moisture content of partially acidulated mass charged to autoclave, per cent | Temperature range of transition, °C. | Pressure range of transition, lbs./sq. in. (gage) | Time of transition, minutes | Analysis of product, per cent | |
|---|---|---|---|---|---|---|---|---|---|---|
| 1 | B | 113.8 | 435 | 38.2 | 2.38 | 147–186 | 35–95 | 10 | Moisture | 1.40 |
| | | | | | | | | | Available P$_2$O$_5$ | 46.59 |
| | | | | | | | | | Insoluble P$_2$O$_5$ | 2.81 |
| | | | | | | | | | Total P$_2$O$_5$ | 49.40 |
| | | | | | | | | | Water soluble P$_2$O$_5$ | 9.84 |
| 2 | B | 113.8 | 470 | 41.3 | 3.42 | 145–191 | 50–105 | 9 | Moisture | 1.21 |
| | | | | | | | | | Available P$_2$O$_5$ | 47.91 |
| | | | | | | | | | Insoluble P$_2$O$_5$ | 1.36 |
| | | | | | | | | | Total P$_2$O$_5$ | 49.27 |
| | | | | | | | | | Water soluble P$_2$O$_5$ | 9.65 |
| 3 | B | 113.8 | 505 | 44.3 | 3.06 | 138–193 | 50–140 | 10 | Moisture | 1.26 |
| | | | | | | | | | Available P$_2$O$_5$ | 48.12 |
| | | | | | | | | | Insoluble P$_2$O$_5$ | 1.21 |
| | | | | | | | | | Total P$_2$O$_5$ | 49.33 |
| | | | | | | | | | Water soluble P$_2$O$_5$ | 14.24 |
| 4 | A | 118.3 | 505 | 42.7 | 6.22 | 131–184 | 35–105 | 10 | Moisture | 1.66 |
| | | | | | | | | | Available P$_2$O$_5$ | 47.53 |
| | | | | | | | | | Insoluble P$_2$O$_5$ | 1.92 |
| | | | | | | | | | Total P$_2$O$_5$ | 49.45 |
| | | | | | | | | | Water soluble P$_2$O$_5$ | 13.00 |

The analyses of mineral phosphates employed in the four conversions presented in Table I are given in Table II.

TABLE II
*Composition of mineral phosphates employed*

| Constituent | Mineral phosphate | |
|---|---|---|
| | A | B |
| | *Per cent* | *Per cent* |
| CaO | 50.0 | 48.2 |
| Al$_2$O$_3$ | 0.9 | 1.0 |
| Fe$_2$O$_3$ | 0.7 | 0.9 |
| P$_2$O$_5$ | 35.7 | 34.4 |
| F$_2$ | 3.9 | 3.9 |

As the moisture content of the partially acidulated mass charged to the autoclave is increased, the exothermic chemical transition becomes less pronounced and effective; and when the moisture content of the mass charged to the specific autoclave described above was increased to or beyond 12 per cent, no useful result was obtained. The effect of moisture content on the conversion of citrate-insoluble to citrate-soluble P$_2$O$_5$ is presented in Table III.

TABLE III

*Effect of moisture on conversion*

| Run number | Mineral phosphate employed | Qm | Grams H₃PO₄ employed per kilogram mineral phosphate— expressed as 100% H₃PO₄ | Per cent acidulation | Moisture content of partially acidulated mass charged to autoclave, per cent | Maximum temperature attained, °C. | Maximum pressure attained, lbs./sq. in. (gage) | Time above 130° C., minutes | Analysis in per cent | Charge | Product |
|---|---|---|---|---|---|---|---|---|---|---|---|
| 3 | B | 113.8 | 505 | 44.3 | 3.06 | 193 | 140 | 13 | Moisture | 3.06 | 1.26 |
|   |   |   |   |   |   |   |   |   | Available P₂O₅ | 36.00 | 48.12 |
|   |   |   |   |   |   |   |   |   | Insoluble P₂O₅ | 9.58 | 1.21 |
|   |   |   |   |   |   |   |   |   | Total P₂O₅ | 45.58 | 49.33 |
|   |   |   |   |   |   |   |   |   | Water soluble P₂O₅ | 31.91 | 14.24 |
| 4 | A | 118.3 | 505 | 42.7 | 6.22 | 184 | 105 | 13 | Moisture | 6.22 | 1.66 |
|   |   |   |   |   |   |   |   |   | Available P₂O₅ | 34.43 | 47.53 |
|   |   |   |   |   |   |   |   |   | Insoluble P₂O₅ | 10.37 | 1.92 |
|   |   |   |   |   |   |   |   |   | Total P₂O₅ | 44.80 | 49.45 |
|   |   |   |   |   |   |   |   |   | Water soluble P₂O₅ | 32.34 | 13.00 |
| 5 | B | 113.8 | 510 | 44.8 | 9.01 | 193 | 115 | 35 | Moisture | 9.10 | 4.10 |
|   |   |   |   |   |   |   |   |   | Available P₂O₅ | 33.10 | 41.13 |
|   |   |   |   |   |   |   |   |   | Insoluble P₂O₅ | 9.01 | 4.27 |
|   |   |   |   |   |   |   |   |   | Total P₂O₅ | 42.11 | 45.70 |
|   |   |   |   |   |   |   |   |   | Water soluble P₂O₅ | 29.12 | 17.02 |
| 6 | B | 113.8 | 510 | 44.8 | 11.86 | 188 | 105 | 40 | Moisture | 11.86 | 7.43 |
|   |   |   |   |   |   |   |   |   | Available P₂O₅ | 32.22 | 34.49 |
|   |   |   |   |   |   |   |   |   | Insoluble P₂O₅ | 8.49 | 8.92 |
|   |   |   |   |   |   |   |   |   | Total P₂O₅ | 40.71 | 43.41 |
|   |   |   |   |   |   |   |   |   | Water soluble P₂O₅ | 28.43 | 21.00 |

Conversions number 3 and 4 are taken from Table I. The charges for runs number 5 and 6 were prepared by mixing one kilogram of mineral phosphate with 600 grams of 85 per cent $H_3PO_4$ and 100 and 175 cubic centimeters of water, respectively; and the runs were conducted in the manner already described. In neither run was an abrupt increase in temperature and pressure observed. In run number 5 the moisture content of the charge being 9.10 per cent, approximately 50 per cent of the citrate-insoluble $P_2O_5$ was converted to the citrate-soluble form. But in run number 6, the moisture content of the charge being 11.86 per cent, conversion of citrate-insoluble $P_2O_5$ to the citrate-soluble form did not occur in spite of the prolonged treatment of 40 minutes at temperatures about 130° C.; a useful result was not obtained. This same mass which weighed approximately 1.7 kilograms might be charged to an autoclave having a capacity greater than 230 cubic inches, the cubic capacity of the autoclave here employed. In such a case sufficient $H_2O$ might be evolved into the vapor space when temperatures above 130° C. are attained to reduce the $H_2O$ present in the partially acidulated mass to a value optimum for effective occurrence of the exothermic chemical transition. Therefore, the moisture content of the partially acidulated mass charged to a pressure apparatus is a limitation which can be circumvented by a judicious choice of equipment. Moreover, the moisture content of a partially acidulated mineral phosphate in a pressure apparatus might also be reduced to an optimum value by arranging for the escape of steam and gases through a pressure expansion valve.

The moisture content of the product, however, indicates the minimum moisture content attained during treatment in a pressure apparatus and is a limitation which defies circumvention. In run number 6, of Table III, the moisture content of the charge was 11.58 per cent and of the product was 7.43 per cent. No useful result was obtained. Therefore, a moisture content of 7.43 per cent of a product upon leaving a pressure apparatus must be accepted as the upper limit of moisture allowing the attainment of a useful result.

To pursue exploitation of this process in the outer regions of variable factors—moisture content, per cent aciduation, temperature, pressure—is to ignore indiscreetly the easy advantages which are available at optimum conditions. Simply aciduating mineral phosphate with 40 to 50 per cent of the $H_3PO_4$ indicated by Qm, providing for a moisture content of 3 to 6 per cent of the partially aciduated mineral phosphate, and simultaneously mixing and subjecting this combination to temperatures between 130° C. and 220° C. and gage pressures greater than 25 pounds per square inch is the preferred procedure for realizing the advantages this invention allows. This may be done either as a continuous or as a batch operation.

I am aware that the autoclave process has been employed to produce phosphatic fertilizer which differs from ordinary superphosphate only in some physical characteristics. Also, I am aware that ideas for converting mineral phosphate to an available form with a deficiency of mineral acids have been proposed and broadly claimed. These claims remain unsubstantiated, for no operative process consummating such claims can be found in the art. However it may now appear, my invention is not the result of combining useless ideas with a pressure technique. Rather, my invention results merely from the discovery of an exothermic chemical transition which allows the actual attainment of a long desired useful result. Therefore, I claim:

1. The process of preparing a concentrated phosphate fertilizer which comprises mixing ground phosphate rock and concentrated phosphoric acid in amount sufficient to yield a product containing at least 90 percent of its total $P_2O_5$ content in available form distributed between monocalcium and dicalcium phosphates, but not more than approximately 50 percent of the quantity theoretically necessary to convert all the calcium in the phosphate rock to monocalcium phosphate, heating and agitating the mixture under superatmospheric pressure in the presence of a small amount of moisture to a temperature in excess of about 130° C. and for a time sufficient to yield a product having over 50 per cent of its available $P_2O_5$ content in the form of dicalcium phosphate; the aforesaid heating and agitating process including, and at least terminating with, the step of agitating the mixture under superatmospheric pressure at a temperature in excess of about 130° C. while maintaining the moisture content of the mixture below about 12%.

2. The process of preparing a concentrated phosphate fertilizer which comprises mixing ground phosphate rock and concentrated phosphoric acid in amount sufficient to yield a product containing at least 90 percent of its total $P_2O_5$ content in available form distributed between monocalcium and dicalcium phosphates, but not more than approximately 50 percent of the quantity theoretically necessary to convert all the calcium in the phosphate rock to monocalcium phosphate, heating and agitating the mixture under superatmospheric pressure in the presence of a small amount of moisture to a temperature in excess of about 130° C. and for a time sufficient to yield a product having over 50 percent of its available $P_2O_5$ content in the form of dicalcium phosphate; the aforesaid heating and agitating process including, and at least terminating with, the step of agitating the mixture under superatmospheric pressure at a temperature in excess of about 130° C. while maintaining the moisture content of the mixture not more than about 9%.

3. The process of preparing a concentrated phosphate fertilizer which comprises mixing ground phosphate rock and concentrated phosphoric acid in amount sufficient to yield a product containing at least 90 percent of its total $P_2O_5$ content in available form distributed between monocalcium and dicalcium phosphates, but not more than approximately 50 percent of the quantity theoretically necessary to convert all the calcium in the phosphate rock to monocalcium phosphate, heating and agitating the mixture under superatmsopheric pressure in the presence of a small amount of moisture to a temperature in excess of about 130° C. and for a time sufficient to yield a product having over 50 percent of its available $P_2O_5$ content in the form of dicalcium phosphate; the aforesaid heating and agitating process including, and at least terminating with, the step of agitating the mixture under superatmospheric pressure at a temperature in excess of about 130° C. while maintaining the moisture content of the mixture not more than about 6%.

4. The process of claim 1 wherein the last-mentioned step includes vaporizing and withdrawing moisture from the heated mixture to provide, in the product, a moisture content of not more than about 7.4%.

5. The process of claim 2 wherein the last-mentioned step includes vaporizing and withdrawing moisture from the heated mixture to provide, in the product, a moisture content of about 4%.

6. The process of claim 3 wherein the last-mentioned step includes vaporizing and withdrawing moisture from the heated mixture to provide, in the product, a moisture content of less than about 2%.

7. The process of preparing a concentrated phosphatic fertilizer having at least 90 per cent of its total $P_2O_5$ content in the neutral-ammonium-citrate-soluble forms of monocalcium phosphate and dicalcium phosphate, which process comprises mixing ground phosphate rock with a proportion of $H_3PO_4$ substantially less than that theoretically necessary to convert all the calcium of the phosphate rock to nonocalcium phosphate but greater than that theoretically necessary to convert the calcium content to dicalcium phosphate, heating and agitating the mixture in the presence of less than 12 per cent moisture at gage pressures greater than 25 pounds per square inch to temperatures in excess of 130° C. so as to allow the herein described exothermic chemical transition to ensue to yield a product having at least 50 per cent of its available $P_2O_5$ in the form of dicalcium phosphate.

8. The process of preparing a phosphatic fertilizer having at least 90 per cent of its total $P_2O_5$ content in the neutral-ammonium-citrate soluble forms of monocalcium phosphate and dicalcium phosphate, which process comprises mixing ground phosphate rock with an amount of mineral acid substantially less than its acidulation equivalent of the proportion of $H_3PO_4$ theoretically necessary to convert all the calcium of the phosphate rock to monocalcium phosphate but greater than its acidulation equivalent of the proportion of $H_3PO_4$ theoretically necessary to convert the calcium content to dicalcium phosphate, heating and agitating the mixture in the presence of less than 12 per cent moisture at gage pressures greater than 25 pounds per square inch to temperatures in excess of 130° C. so as to allow the herein described exothermic chemical transition to ensue to yield a product having a substantial portion of its available $P_2O_5$ in the form of dicalcium phosphate.

9. The process of preparing a phosphatic fertilizer having at least 90 per cent of its total $P_2O_5$ content in the neutral-ammonium-citrate-soluble forms of monocalcium phosphate and dicalcium phosphate, which process comprises mixing ground phosphate rock with an amount of a mixture of mineral acids substantially less than its acidulation equivalent of the proportion of $H_3PO_4$ theoretically necessary to convert all the calcium of the phosphate rock to monocalcium phosphate but greater than its acidulation equivalent of the proportion of $H_3PO_4$ theoretically necessary to convert the calcium content of dicalcium phosphate, heating and agitating the mixture in the presence of less than 12 per cent moisture at gage pressures greater than 25 pounds per square inch to temperatures in excess of 130° C. so as to allow the herein described exothermic chemical transition to ensue to yield a product having a substantial portion of its available $P_2O_5$ content in the form of dicalcium phosphate.

THOMAS W. ZBORNIK.

Certificate of Correction

Patent No. 2,361,444. October 31, 1944.

THOMAS W. ZBORNIK

It is hereby certified that errors appear in the printed specification of the above numbered patent requiring correction as follows: Page 1, second column, line 21, for that portion of the equation reading "$Co_{10}(PO_4)_6F_2+7H_2SO_4$" read $Ca_{10}(PO_4)_6F_2+14HCl$; page 4, second column, line 27, for "aciduation" read *acidulation*; line 30, for "aciduating" read *acidulating*; line 33, for "aciduated" read *acidulated*; page 5, second column, line 9, claim 7, for "nonocalcium" read *monocalcium*; line 53, claim 9, for "content of" read *content to*; and that the said Letters Patent should be read with these corrections therein that the same may conform to the record of the case in the Patent Office.

Signed and sealed this 23rd day of January, A. D. 1945.

[SEAL]

LESLIE FRAZER,
*Acting Commissioner of Patents.*